United States Patent [19]
Kataoka et al.

[11] Patent Number: 6,102,585
[45] Date of Patent: Aug. 15, 2000

[54] CAMERA HAVING OPERATING BUTTONS WHICH, WHILE ARRANGED IN CLOSE PROXIMITY, ARE DESIGNED TO PREVENT INADVERTENT OPERATION THEREOF

[75] Inventors: Setsuya Kataoka, Hachioji; Koji Kato, Tama, both of Japan

[73] Assignee: Olympus Optical Co., Ltd., Shibuya-Ku, Japan

[21] Appl. No.: 09/204,378

[22] Filed: Dec. 2, 1998

[30] Foreign Application Priority Data

Dec. 4, 1997 [JP] Japan ................................. 9-334394

[51] Int. Cl.[7] ............................ G03B 17/00; G03B 17/38
[52] U.S. Cl. ............................................. 396/439; 396/502
[58] Field of Search ................................. 396/439, 502, 396/503, 504

[56] References Cited

U.S. PATENT DOCUMENTS

| | | | |
|---|---|---|---|
| 3,186,319 | 6/1965 | Hochstein | 396/502 |
| 4,441,801 | 4/1984 | Mashimo et al. | 396/502 |
| 5,126,772 | 6/1992 | Albrecht | 396/502 |
| 5,274,411 | 12/1993 | Kwak | 396/502 |
| 5,339,124 | 8/1994 | Harms | 396/502 |
| 5,408,287 | 4/1995 | Winegarden et al. | 396/502 |
| 5,678,107 | 10/1997 | Arai et al. | 396/502 |
| 5,740,478 | 4/1998 | Kobayashi | 396/121 |

FOREIGN PATENT DOCUMENTS

| | | |
|---|---|---|
| 54-107339 | 8/1979 | Japan . |
| 59-9290 | 1/1984 | Japan . |

*Primary Examiner*—Eddie C. Lee
*Attorney, Agent, or Firm*—Louis Weinstein

[57] ABSTRACT

A camera including a hole drilled in the top surface of the outer housing member of the camera, a shaft extending across and fixed within the hole, a release button mounted within the hole in a manner such that the release button pivots about the shaft, a step formed within the hole to restrain the pivotal motion of the release button in one direction, a hole drilled in the top surface of the outer housing in the vicinity of the side where the pivotal motion of the release button is restrained by the step, and a photograph mode button mounted in the hole in a manner such that the photograph mode button is pressed to operate. With these plurality of operational members mounted in close vicinity, the camera not only imposes no complex operation on a photographer but also helps the photographer make less erratic operations.

14 Claims, 3 Drawing Sheets

CAMERA HAVING OPERATING BUTTONS WHICH, WHILE ARRANGED IN CLOSE PROXIMITY, ARE DESIGNED TO PREVENT INADVERTENT OPERATION THEREOF

BACKGROUND OF THE INVENTION

1. Field of the Invention

The present invention relates to a camera and, more particularly, to a camera having a plurality of operational members that are selectively pressed for operation.

2. Related Art Statement

A diversity of cameras have been proposed which have a plurality of operational members that are selectively pressed for operation, such as a shutter button and a photograph mode button.

Referring to FIG. 4, one example of such a camera is now discussed.

A camera 51 has, on the top surface of its camera body 52, a release button 53 for receiving a command for photographing, a zoom button 54 for varying the focal length of an imaging lens, a self button 55 for performing a self-timer photographing, and a mode button 56 for changing the photograph mode of the camera, and these buttons, when pressed by a finger of a photographer, are activated into operation.

Referring to FIG. 5, the construction of the release button 53 is further discussed.

The camera body 52 of the camera 51 is provided with a round hole 52a, in which the release button 53 is mounted. The release button 53 is glued onto an elastic support member 57, made of rubber or other material, against the camera body 52, and by pressing the release button 53, its tip 53a moves inwardly into the camera. A release switch 58 is arranged in the travel path of the tip 53a.

As compact design has been implemented in the camera today, the spacing available for buttons and other controls on the top surface of the camera becomes scarce. When the plurality of operational members described above are arranged on the same surface, these buttons are close in location to each other, and, for example, when the photograph mode button is pressed, the finger may happen to touch the shutter button.

When the release button 53 is pressed at any point on its top surface in the camera constructed as described above, the release switch 58 is turned on at any rate, and the release operation may be activated by such an erratic action.

As means for preventing such an erratic activation, Japanese Unexamined Patent Publication No. 54-107339 discloses the camera in which the setting of photographing information is carried out by concurrent operations of a setting input key and a safety button.

The mechanism disclosed in Japanese Unexamined Patent Publication No. 54-107339 requires that the photographer concurrently operate the two buttons in the selection of photograph mode, and thus inconveniences the photographer.

According to the technique disclosed in Japanese Examined Patent Publication No. 59-2890, a cover is provided on top of an operational member for adjusting the shutter speed and diaphragm stop to prevent a novice from inadvertently operating the operational member and still to permit an experienced photographer to operate it as required.

The technique disclosed in Japanese Examined Patent Publication No. 59-2890 also requires that the photographer open the cover to operate, for example, a photograph mode button and inconveniences the photographer as well.

OBJECTS AND SUMMARY OF THE INVENTION

It is a first object of the present invention to provide a camera which prevents an erratic operation due to the presence of a plurality of operational members.

It is a second object of the present invention to provide a camera which prevents an erratic operation without the need for a complex operational step even if a plurality of operational members are arranged in close vicinity to one another on the camera.

It is a third object of the present invention to provide a camera which offers an increased freedom of layout of a plurality of operational members.

It is a fourth object of the present invention to provide a camera which permits a compact design to be implemented.

The camera of the present invention includes a first operational member which activates a first camera function, when pivoted about a shaft aligned perpendicular to the direction of the pressing by a finger with the finger pressing an exposed operational surface of the first operational member in a predetermined within-range area thereof, in a direction generally perpendicular to the external surface of a camera body, wherein a pivotal motion of the first operational member in response to a pressing action exerted onto the exposed operational surface in a predetermined out-of-range area thereof is blocked, and a second operational member for activating a second camera function by pressing the exposed operation surface thereof by the finger in a direction generally perpendicular to the external surface of the camera, wherein the first and second operational members are arranged such that when the second operational member is pressed by a single finger, only the predetermined out-of-range area of the operational surface of the first operational member is within reach of the finger.

These as well as other objects and advantages of the present invention will become further apparent from the following detailed description.

DETAILED DESCRIPTION OF THE PREFERRED EMBODIMENTS

Figure 1:
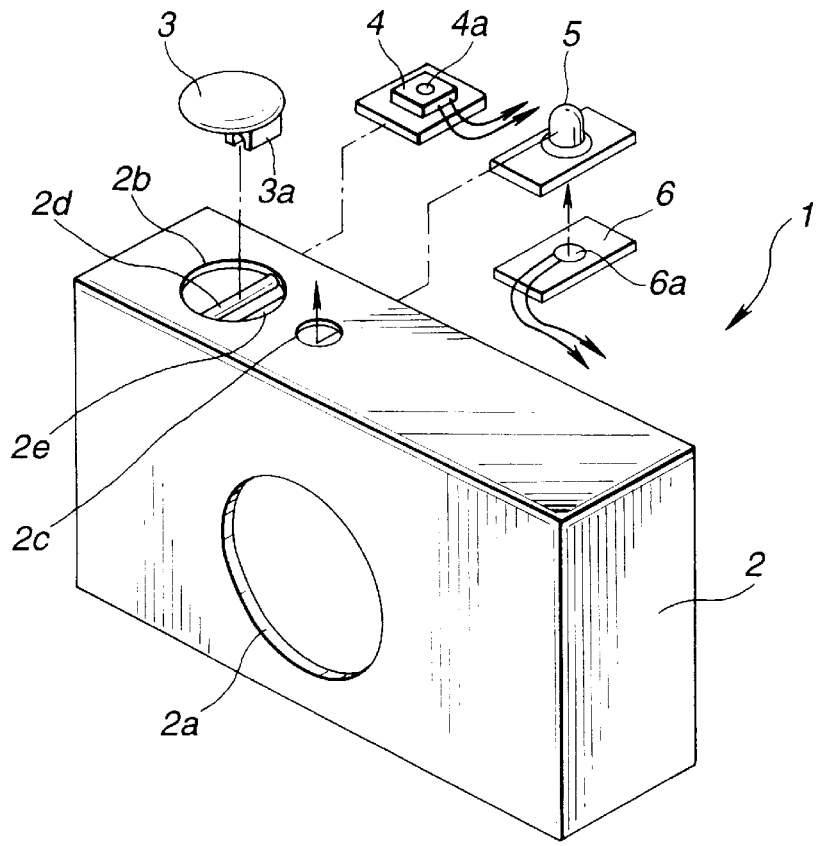
FIG. 1 is an exploded perspective view showing operational members mounted onto the outer housing of a camera according to a first embodiment of the present invention.

Referring to the drawings, the embodiments of the present invention are discussed.

Figure 2:
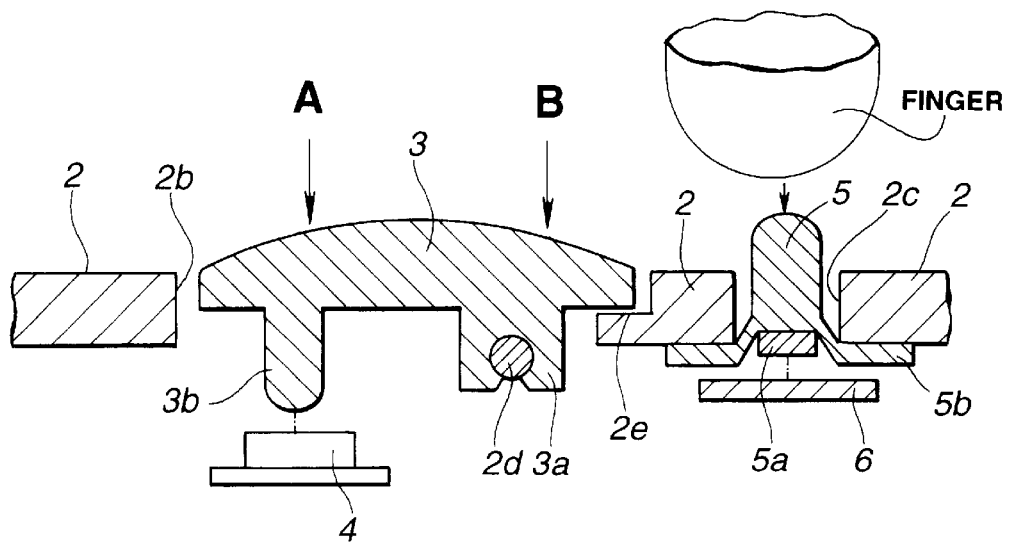
FIG. 2 is a cross-sectional view showing the operational members mounted on the outer housing of the camera of the first embodiment of the present invention.

FIG. 1 and FIG. 2 show a first embodiment of the present invention, wherein FIG. 1 is an exploded perspective view showing operational members mounted onto the outer housing of a camera and FIG. 2 is a cross-sectional view showing the operational members mounted on the outer housing of the camera.

The camera 1 comprises an outer housing member 2 having a round hole 2a in the near center of its front side to let an unshown lens barrel to pass therethrough, a hole 2b for mounting a release button 3 as a release operational member is drilled on the left end portion of the top surface of the outer housing member 2, and a hole 2c for mounting a photograph mode button 5 as a mode operational member is drilled near and to the right of the hole 2b. Each of the release button 3 and photograph mode button 5 is mounted in a location which permits the index finger to operate it.

Arranged within the hole 2b are a shaft 2d for rotatably supporting the release button 3, and a step portion 2e as erratic-operation prevention means for restraining the clockwise pivot of the release button 3 in FIG. 2.

The release button 3 is a member to be pressed by a finger, and comprises a socket portion 3a in which the shaft 2d is seated, and a pressure tip portion 3b, spaced from the socket portion 3a by a predetermined distance and projecting inwardly into the camera. The shaft 2d is press-fitted into the socket portion 3a so that the release button 3 may not fall off, and the release button 3 is thus secured to the camera 1.

Arranged in the travel path of the pressure tip portion 3b within the camera 1 is a release switch board 4, and a release switch 4a is mounted on the release switch board 4.

Like the release button 3, the photograph mode button 5 is a member to be pressed by the finger, but its area the finger contacts is smaller than that of the release button 3. The mounting location of the photograph mode button 5 is in the close vicinity of the release button 3, and is closer to the side where the step portion 2e is formed.

The photograph mode button 5 is manufactured of an elastic material such as rubber. The photograph mode button 5 is inserted into the hole 2c from inside the outer housing member 2 to mount it onto the outer housing member 2. A board 5b for the photograph mode button 5 has, on its underside, a pressure portion 5a manufactured of rubber having electric conductivity.

Arranged below the photograph mode button 5 within the camera 1 is a mode switch board 6 and an electrode 6a mounted on the mode switch board 6 is arranged in the travel path of the pressure portion 5a.

The photograph modes may include, for example, an exposure mode, a film advance mode, a self mode, a date setting mode and a panorama mode, but are not limited to these modes.

The operation of the above embodiment is now discussed.

To press the release button 3, a finger of a photographer applies a force onto the surface of the release button 3 to the left of the shaft 2d in a direction represented by an arrow A as shown in FIG. 2. The release button 3 pivots about the shaft 2d, moving its pressure tip portion 3b downward to turn on the release switch 4a on the release switch board 4. A release signal is output to an unshown CPU, executing a predetermined photograph sequence.

When the photograph mode button 5 is pressed to change the photograph mode, the photographer presses the photograph mode button 5 in. The pressure portion 5a moves downward and comes into contact with the electrode 6a, outputting a signal to unshown control means to change the photograph mode. The changing of the photograph mode is performed each time the photograph mode button 5 is pressed, to cycle through a plurality of photograph modes, one after another.

In the layout of the release button 3 and photograph mode button 5 on the top surface of the outer housing member 2, the finger may touch the release button 3 when the finger presses the photograph mode button 5. Even if a force is applied, as shown by an arrow B, onto the side of the surface of the release button 3 closer to the photograph mode button 5, the release button 3 abuts the step portion 2e and its further pivotal motion is thus restrained. An erratic activation of the release operation is thus prevented.

With the range of pivotal motion of the release button 3 limited in this way, an erratic activation of the photographing is prevented during the pressing of the photograph mode button 5.

In the above discussion, the button, mounted in the vicinity of the release button, is the photograph mode button. The same arrangement works if the button mounted in the vicinity of the release button is a zoom button.

The photograph mode button has the pressure portion manufactured of rubber having electric conductivity in the above embodiment. Alternatively, the pressure portion may be manufactured of a non-conductive material and turns on and off a leaf switch of a metal strip.

In the above discussion, the photograph mode button is moved inwardly into the camera. Alternatively, like the release button, the photograph mode button may be designed to pivot about a shaft, or the photograph mode button may have a lever-like structure, both ends of which are raised or lowered with a shaft pivotally supporting it.

The camera of this embodiment may be of a type using a silver film or may be a digital camera that works on a memory card or MD.

According to the first embodiment, in the arrangement in which the release button pivots about the shaft, the release operation is carried out when the release button is pressed on one side, while the release operation is disabled when the release button is pressed on the other side. Since the photograph mode button is mounted near the side where the release operation is disabled, no erratic activation of the release operation is performed even if the release button is erratically touched during the manipulation of the photograph mode button.

Since other operational buttons may be mounted in the close vicinity of the release button, the freedom of layout of the operational members is increased and a compact design is implemented in the camera.

Figure 3:
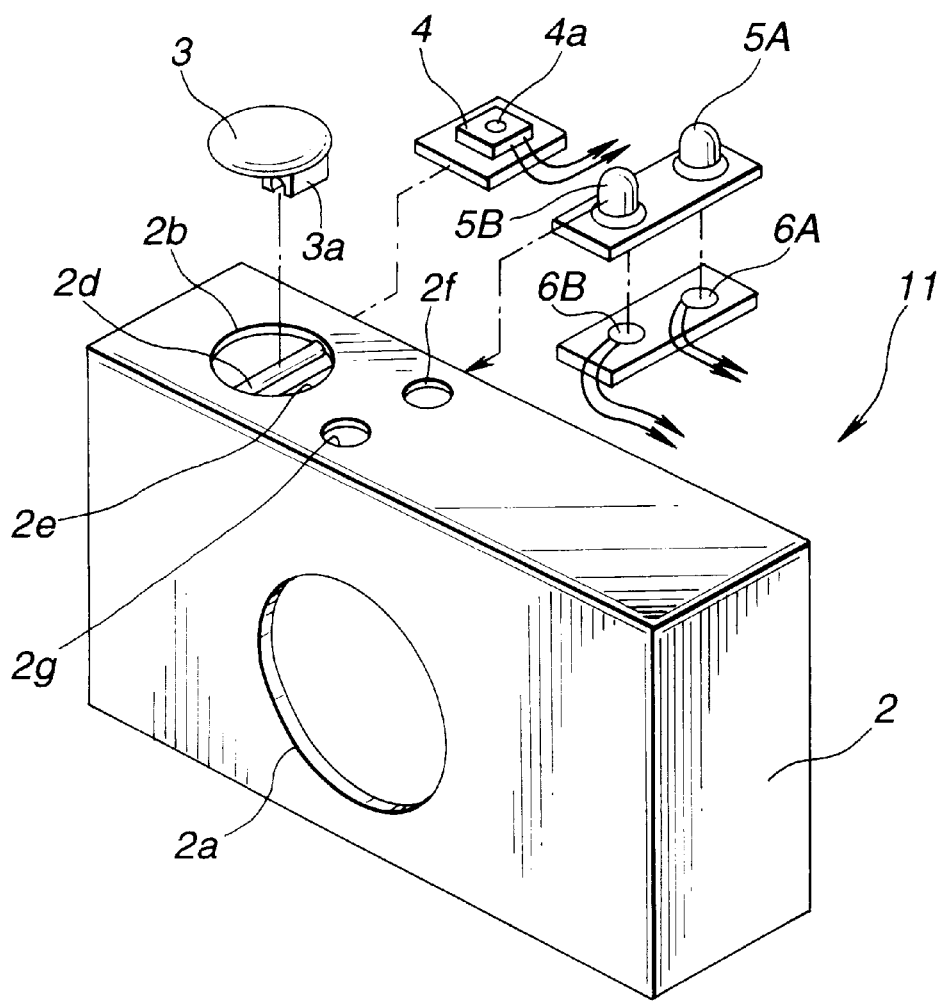
FIG. 3 is an exploded perspective view showing operational members mounted onto the outer housing of a camera according to a second embodiment of the present invention.
Figure 4:
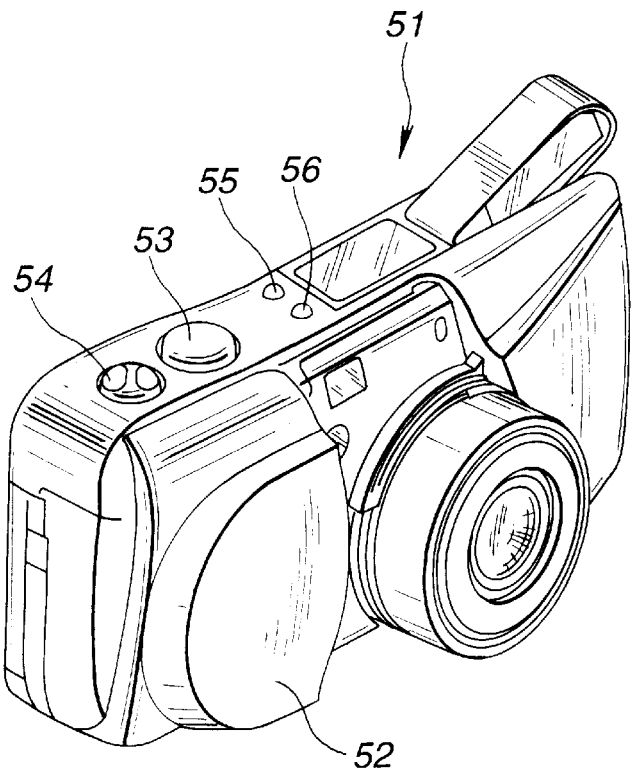
FIG. 4 is a perspective view showing the layout of operational members in a camera of the related art.
Figure 5:
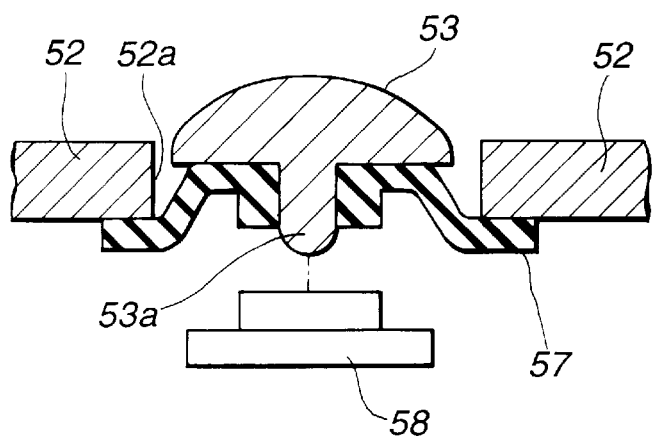
FIG. 5 is a cross-sectional view showing the operational members in the camera of the related art.

FIG. 3 shows a second embodiment of the present invention, and is an exploded perspective view of the arrangement of the operational members onto the outer housing of a camera. In the discussion of the second embodiment, components equivalent to those in the first embodiment are identified with the same reference numerals, and the discussion about them is omitted here and major differences therebetween are discussed here.

The second embodiment employs a plurality of photograph mode buttons.

A hole 2b is drilled in the top surface of the outer housing 2 of a camera 11. In the vicinity of and to the right of the hole 2b, two holes 2f and 2g are drilled for operational members 5A and 5B to be pressed with a finger.

The areas of the operational members 5A and 5B the finger touches are smaller than that of a release button 3. As in the first embodiment, a step portion 2e is formed close to the release button 3.

Arranged below the operational members 5A and 5B within the camera 11 are switches 6A and 6B.

The remainder of the construction and operation of the second embodiment remain substantially unchanged from, those in the first embodiment.

The single operational member is arranged in the first embodiment while the two operational members are arranged in the second embodiment. The number of operational members is not limited to these numbers. More operational members may be used.

The second embodiment employing a plurality of operational members arranged in the vicinity of the photograph mode button presents substantially the same advantage as the first embodiment.

In this invention, it is apparent that working modes different in a wide range can be formed on this basis of this invention without departing from the spirit and scope of the invention. This invention is not restricted by any specific embodiment except being limited by the appended claims.

What is claimed is:

1. A camera comprising:

a camera body;

a lens mounted on the camera body;

a first operational member having an operating surface extending through an external surface of said camera body located between said lens and one side of said camera body and being rockably mounted upon a shaft positioned in said camera body;

said shaft been aligned to enable a first portion of said first operational member lying to one side of said shaft to pivot about said shaft in a first direction toward an interior of said camera body while a second portion of said first operational member lying to an opposite side of said shaft, pivots about said shaft in said first direction away from the interior of the camera body when a force which is directed towards the interior of said camera body is applied to said first portion and to enable said second portion of said first operational member to pivot in a second direction toward the interior of said camera body and said first portion to pivot in said second direction away from the interior of said camera body, when a force which is directed towards the interior of said camera body is applied to said second portion;

a first sensing member engaged by said first operational member when said first operational member is moved in said first direction for initiating a first camera function;

a blocking member for preventing said first operational member from engaging said first sensing member when said first operational member is pivoted in said second direction;

a second operational member exposed through a second opening in said camera body positioned on the same surface of said camera body as said first operational member and adjacent to said first operational member, said second operational member being movable in a direction toward the interior of said camera body;

a second sensing member for initiating a second camera function different from said first camera function when engaged by said second operational member;

an external surface of said second operational member being positioned adjacent to said first operational member so as to be closer to said second portion of said first operational member and further away from said first portion of said first operational member and being positioned to one side of said shaft, whereby, when a tip of a finger overlies said first operational member, the external surface of said second operational member is arranged relative to said first operational member so as to prevent the tip of the finger from pressing the second operational member towards the interior of the camera body and pivot the first operational member in said first direction simultaneously therewith.

2. A camera according to claim 1, wherein said first operational member is a release operational member for starting a photographing operation of said camera; said second operational member is a mode operational member for selecting any photograph mode among a plurality of photograph modes and is smaller in operational area than said first operational member; and pressings exerted onto areas of the operational surface of said first operational member on opposite sides of said shaft cause said first operational member to pivot about the shaft in mutually opposite directions.

3. A camera having a taking lens comprising:

a mode selecting member for selecting a photograph mode among a plurality of photograph modes by application of a force pressing said mode selecting member in a given direction; and a release member that is mounted to pivot about a shaft and permits a photographing operation of said camera when pivoted in a first direction by a force applied thereto, wherein said mode selecting member and said release member are mounted in a close vicinity to one another along a surface of an outer casing of a camera body and to one side of said lens and a direction of movement of each member is toward a surface of the outer casing adjacent to said mode selecting member and said release member, and wherein an operational surface of said release member includes a predetermined within-range area within which a pressing force pivots said release member in a first direction to enable a release operation and a predetermined out-of-range area within which pivotal motion in a second direction is blocked to prevent a release operation, and said release member is mounted close to said mode selecting member and arranged so that said within-range area is farther from said mode selecting member than said predetermined out-of-range area and said out of range area lies between said shaft and said mode selecting member.

4. A camera according to claim 3, wherein said mode selecting member and said release member are mounted on a top surface of said camera body which has a camera grip and said release member is closer to said camera grip than said mode selecting member.

5. A camera, having a taking lens, comprising:

a first pivotally mounted operational member which activates a first camera function, by pivoting in a first direction when a force is applied to an exposed operational surface of said first operational member in a predetermined within-range area thereof which area is located to one side of an axis of said pivotal mounting, in a direction toward an external surface of a camera body, wherein a pivotal motion of said first operational member in a second direction opposite said first direction in response to a force applied to a predetermined out-of-range area of the exposed operational surface, located to another side of said pivot axis, is blocked; and a second operational member for activating a second camera function by a force applied to an exposed operational surface thereof in a direction toward the external surface of the camera body, wherein said first and second operational members are arranged in close proximity to one another to one side of a taking lens and wherein the second operational member is closer to said out-of-range area and further away from said in-range area such that, when the force is applied to said second operational member by a tip of a single finger engaging said second operational member, the predetermined within-range area of the operational surface of the said first operational member is further away from said single finger tip and the predetermined out-of-range area is closer to and partly within reach of said single finger tip.

6. A camera according to claim 5, wherein said first operational member is a release operational member for starting a photographing operation of said camera and said second operational member is a mode operational member for selecting any photograph mode among a plurality of photograph modes.

7. A camera according to claim 5, wherein said second operational member has a smaller operational area than said first operational member.

8. A camera according to claim 5, further comprising:
   a shaft for pivotally supporting said first operational member;
   said first operational member having a socket portion for receiving said shaft; and
   a stopper portion, arranged integrally with an outer housing member of said camera body, for abutting said first operational member so that the pivotal motion of said first operational member is blocked when the pressing action is exerted to pivot said first operational member in said second direction.

9. A camera, having a taking lens, comprising:
   a first button operating in response to a pressing force; and
   a second button that is positioned in close proximity to said first button and that pivots in a first direction about a shaft into operation in response to a pressing force,
   wherein said shaft is mounted between said first button and a position offset from a center of said second button, said first and second buttons operating different camera functions and being located along a surface of the camera to one side of said taking lens.

10. A camera according to claim 9, further comprising a blocking step arranged between said first button and said shaft to prevent said second button from pivoting in a direction opposite said first direction when a finger tip pressing said first button overlaps said second button and engages the second button in a region opposite said blocking step.

11. A camera according to claim 9, further comprising a switch arranged relative to said second button so that pivoting of said second button in said first direction operates said switch and pivoting of said second button in said direction opposite said first direction is incapable of operating said switch.

12. A camera having a taking lens and a plurality of units, comprising:
   a first operational member that performs a camera operation in response to a pressing force; and
   a second pivotally mounted operational member that performs a camera operation in response to a pressing force and has, on an exposed section of a surface of the camera, a press-enabled surface area which pivots the second operational member in a first direction when a force is applied thereto and a press-blocked area which remains inoperative by preventing pivoting of the second operational member in a second direction when a force is applied to the press-blocked area to pivot said second operational member in a second direction opposite said first direction,
   wherein said first operational member and said second operational member are arranged in close proximity to an extent that when one of said first and second operational members is pressed by a finger tip, a portion of the other operational member is also within reach of said finger tip.

13. A camera according to claim 12, wherein said operational members are positioned so that when one of said first and second operational members is pressed by a tip of a finger, a portion of the other operational member that is within reach of the said finger tip is said press-blocked area.

14. A camera according to claim 12, wherein said second operational member is a release operational member for starting a photographing operation of said camera.

* * * * *